United States Patent
Lee et al.

(10) Patent No.: US 10,892,518 B2
(45) Date of Patent: Jan. 12, 2021

(54) COMPOSITE SOLID ELECTROLYTE, PROTECTED ANODE AND LITHIUM BATTERY INCLUDING THE SAME, AND METHOD OF PREPARING THE COMPOSITE SOLID ELECTROLYTE

(71) Applicants: Samsung Electronics Co., Ltd., Suwon-si (KR); Samsung SDI Co., Ltd., Yongin-si (KR); MIE UNIVERSITY, Tsu (JP)

(72) Inventors: Yonggun Lee, Suwon-si (KR); Nobuyuki Imanishi, Tsu (JP); Osamu Yamamoto, Tsu (JP)

(73) Assignees: SAMSUNG ELECTRONICS CO., LTD., Gyeonggi-Do (KR); SAMSUNG SDI CO., LTD., Gyeonggi-Do (KR); MIE UNIVERSITY, Tsu (JP)

( * ) Notice: Subject to any disclaimer, the term of this patent is extended or adjusted under 35 U.S.C. 154(b) by 506 days.

(21) Appl. No.: 15/340,259

(22) Filed: Nov. 1, 2016

(65) Prior Publication Data

US 2017/0294678 A1    Oct. 12, 2017

(30) Foreign Application Priority Data

Apr. 11, 2016 (KR) .......... 10-2016-0044266

(51) Int. Cl.
*H01M 10/056* (2010.01)
*H01M 8/0245* (2016.01)
(Continued)

(52) U.S. Cl.
CPC .......... *H01M 10/0565* (2013.01); *B05D 1/30* (2013.01); *H01M 4/134* (2013.01); *H01M 4/382* (2013.01);
(Continued)

(58) Field of Classification Search
None
See application file for complete search history.

(56) References Cited

U.S. PATENT DOCUMENTS 9,029,023 B2    5/2015    Choi
9,312,583 B2    4/2016    Lee et al.
(Continued)

FOREIGN PATENT DOCUMENTS

JP    1996-045338 A    2/1996
JP    2014238925 A    12/2014
(Continued)

OTHER PUBLICATIONS

Wang et al, Interface Properties Between Lithium Metal and a Composite Polymer Electrolyte of PEO18Li(CF3SO (Year: 2013).*
(Continued)

*Primary Examiner* — Yoshitoshi Takeuchi
(74) *Attorney, Agent, or Firm* — Cantor Colburn LLP

(57) ABSTRACT

A composite solid electrolyte includes: a lithium ion conductive solid electrolyte; and a polymer-containing electrolyte coating layer on a surface of a lithium ion conductive solid electrolyte, wherein the polymer-containing electrolyte coating layer includes an ion conductive polymer having an alkylene oxide segment.

22 Claims, 10 Drawing Sheets
(2 of 10 Drawing Sheet(s) Filed in Color)

(51) Int. Cl.
| | |
|---|---|
| *H01M 8/0236* | (2016.01) |
| *H01M 8/0239* | (2016.01) |
| *H01M 10/0565* | (2010.01) |
| *H01M 16/00* | (2006.01) |
| *B05D 1/30* | (2006.01) |
| *H01M 4/134* | (2010.01) |
| *H01M 4/38* | (2006.01) |
| *H01M 4/40* | (2006.01) |
| *H01M 4/62* | (2006.01) |
| *H01M 10/0525* | (2010.01) |
| *H01M 10/058* | (2010.01) |
| *H01M 10/052* | (2010.01) |
| *H01M 4/02* | (2006.01) |

(52) U.S. Cl.
CPC ............. *H01M 4/405* (2013.01); *H01M 4/62* (2013.01); *H01M 10/056* (2013.01); *H01M 10/058* (2013.01); *H01M 10/0525* (2013.01); *H01M 16/006* (2013.01); *H01M 10/052* (2013.01); *H01M 2004/027* (2013.01); *H01M 2300/0068* (2013.01); *H01M 2300/0082* (2013.01); *H01M 2300/0085* (2013.01); *H01M 2300/0094* (2013.01)

(56) References Cited

U.S. PATENT DOCUMENTS

| | | | |
|---|---|---|---|
| 2005/0095504 | A1 | 5/2005 | Kim et al. |
| 2007/0172739 | A1* | 7/2007 | Visco ................... H01M 12/08 429/322 |
| 2009/0136830 | A1* | 5/2009 | Gordon ............... H01M 10/056 429/50 |
| 2011/0223487 | A1 | 9/2011 | Johnson et al. |
| 2013/0224609 | A1 | 8/2013 | Lee et al. |
| 2014/0072881 | A1 | 3/2014 | Park et al. |
| 2014/0178777 | A1* | 6/2014 | Lee ....................... H01M 4/405 429/405 |
| 2016/0064770 | A1† | 3/2016 | Lee |

FOREIGN PATENT DOCUMENTS

| | | | |
|---|---|---|---|
| KR | 1020050041661 A | | 5/2005 |
| KR | 1020130099706 A | | 9/2013 |
| KR | 1020140036413 A | | 3/2014 |
| KR | 10-1422908 B1 | | 7/2014 |
| KR | 1020140082074 A | | 7/2014 |
| KR | 1020140091089 A | | 7/2014 |
| KR | 1020150138497 A | | 12/2015 |
| WO | WO 2013/033126 | * 3/2013 | ........ H01M 10/0565 |

OTHER PUBLICATIONS

Takahashi et al, A Super High Lithium Ion Conducting Solid Electrolyte of Grain Boundary Modified Li1.4Ti (Year: 2012).*
Dudney et al, Composite Electrolyte to Stabilize Metallic Lithium Anodes, Presentation at Vehicle Technologies Program Annual Merit Review and Peer Evaluation Meeting (May 2013) (Year: 2013).*
Aetukuri et al., "Flexible Ion-Conducting Composite Membranes for Lithium Batteries", Adv. Energy Mater., 5, 2015, 1500265—pp. 1-6.
Imanishi,"266-Protected Lithium electrode for aqueous lithium/air rechargeable batteries", ENFL, 2014.
Kitaura et al., "Electrochemical Performance of Solid-State Lithium-Air Batteries Using Carbon Nanotube Catalyst in the Air Electrode", Adv. Energy Mater., 2, 2012, pp. 889-894.
Takahashi et al., "A Water Stable High Lithium Ion Conducting LI1.4Ti1.6AI0.4(PO4)—Epoxy Resin Hybrid Sheet", Journal of The Electrochemical Society, 159(7), 2012, A. 1065-A1069.
Tang et al., "Lithium-Stable High Lithium Ion Conducting Li1.4AI0.4Ge0.2Ti1.4(PO4)3 Solid Electrolyte", Journal of The Electrochemical Society, 163(9), 2016, A 1822-A1828.
Ueno et al., "Glyme-Lithium Salt Equimolar Molten Mixtures: Concentrated Solutions or Solvate Ionic Liquids?", The Journal of Physical Chemistry B, 116, 2012, pp. 11323-11331.
Wang et al., "A Composite Polymer Electrolyte Protect Layer between Lithium and Water Stable Ceramics for Aqueous Lithium-Air Batteries", Journal of The Electrochemical Society, 160(4), 2013, A728-A733.
Zhang et al., "Characteristics of lihium-ion-conducting composite polymer-glass secondary cell electrolytes", Journal of Power Sources, 112, 2002, pp. 209-215.
Zhang et al., "Tape-Cat Water-Stable NASICON-Type High Lithium Ion Conducting Solid Electrolyte Films for Aqueous Lithium-Air Batteries", Journal of The Electrochemical Society, 162(7), 2015, A12265-A1271.
Zhang et al., "Water-stable lithium ion conducting solid electrolyte of the Li1.4AI0.4Ti1.6-xGex(PO4)3 system (x=0-1.0) with NASICON-type structure", Solid State Ionics, 235, 2013, pp. 175-180.
Hui Wang et al., "Interface Properties between Lithium Metal and a Composite Polymer Electrolyte of PEO18Li(CF3SO2)2N-Tetraethlene Glycol Dimethyl Ether," Membranes, Oct. 25, 2013, pp. 298-310, vol. 3.
Office Action issued by the Japanese Patent Office dated Jun. 8, 2020 in the examination of the Japanese Patent Application No. 2016-154367, which corresponds to the U.S. Appl. No. 15/340,259.
Hui Wang et al., Interface Properties Between Lithium Metal and a Composite Polymer Electrolyte of PEO18LI(CF3SO2)2N-Tetraethylene Glycol Dimethyl Ether, 298-310, Oct. 25, 2013, MDPI.†

* cited by examiner
† cited by third party

COMPOSITE SOLID ELECTROLYTE, PROTECTED ANODE AND LITHIUM BATTERY INCLUDING THE SAME, AND METHOD OF PREPARING THE COMPOSITE SOLID ELECTROLYTE

CROSS-REFERENCE TO RELATED APPLICATION

This application claims the benefit of and priority to Korean Patent Application No. 10-2016-0044266, filed on Apr. 11, 2016, in the Korean Intellectual Property Office, and all the benefits accruing therefrom under 35 U.S.C. § 119, the content of which is incorporated herein in its entirety by reference.

BACKGROUND

1. Field

The present disclosure relates to a composite solid electrolyte, a protected anode and a lithium battery including the same, and methods of preparing the composite solid electrolyte.

2. Description of the Related Art

Lithium batteries, for example, lithium secondary batteries, are high-performance secondary batteries having the highest energy density of current commercially available secondary batteries. Lithium secondary batteries are used in a variety of fields, such as electric vehicles and energy storage devices.

Recently, demands for a solid electrolyte suitable for use in lithium batteries to provide improved safety and longer lifespan have been increasing. The improved solid electrolyte would desirably provide high lithium ion conductivity and be stable when contacting anode and cathode active materials.

However, well-known solid electrolytes, such as $Li_3N$, do not provide a suitable combination of conductivity and stability.

Therefore, there is still a need for an improved solid electrolyte, an anode and a lithium battery including the same, and a method of preparing the solid electrolyte.

SUMMARY

Provided is a composite solid electrolyte.

Provided is a protected anode including the composite solid electrolyte.

Provided is a lithium battery including the protected anode.

Provided are methods of preparing the composite solid electrolyte.

Additional aspects will be set forth in part in the description which follows and, in part, will be apparent from the description, or may be learned by practice of the presented embodiments.

According to an aspect of an embodiment, a composite solid electrolyte includes: a lithium ion conductive solid electrolyte; and a polymer-containing electrolyte coating layer on a surface of the lithium ion conductive solid electrolyte, wherein the polymer-containing electrolyte coating layer includes an ion conductive polymer having an alkylene oxide segment.

According to an aspect of another embodiment, a protected anode includes: an anode including lithium metal or a lithium alloy; and the composite solid electrolyte, wherein the polymer-containing electrolyte coating layer of the composite solid electrolyte contacts the anode.

According to an aspect of another embodiment, a lithium battery includes the protected anode and a cathode.

According to an aspect of another embodiment, a method of preparing the composite solid electrolyte includes: coating a surface of a lithium ion conductive solid electrolyte with a composition for forming the polymer-containing electrolyte coating layer to form a polymer-containing electrolyte coating layer on the surface of the lithium ion conductive solid electrolyte; and drying the coated lithium ion conductive solid electrolyte to prepare the composite solid electrolyte.

BRIEF DESCRIPTION OF THE DRAWINGS

The patent or application contains at least one drawing executed in color. Copies of this patent or patent application publication with color drawing(s) will be provided by the Office upon request and payment of the necessary fee.

These and/or other aspects will become apparent and more readily appreciated from the following description of the embodiments, taken in conjunction with the accompanying drawings in which.

DETAILED DESCRIPTION

Figure 1:
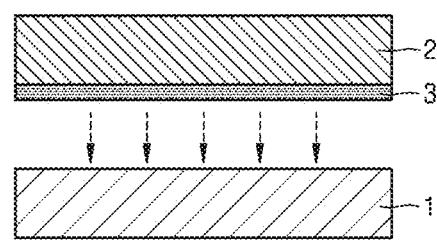
FIG. 1 is a schematic view illustrating a structure of a protected anode in which a composite solid electrolyte according to an embodiment contacts a lithium electrode.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. "Or" means "and/or." Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a composite solid electrolyte according to an embodiment, a protected anode, and lithium battery including the same, and a method of preparing the composite solid electrolyte, will be described in further detail with reference to the accompanying drawings. These embodiments are provided for illustrative purposes only and are not intended to limit the scope of the present disclosure and the present disclosure should be defined by the spirit and scope of the appended claims.

It will be understood that unless otherwise stated herein, the terms "comprises" and/or "comprising," or "includes" and/or "including" do not preclude other elements, but further include other elements.

Composite Solid Electrolyte

In a lithium battery, a solid electrolyte potentially has improved electrochemical safety and stability relative to a combustible liquid electrolyte. A lithium battery uses a Li metal or a Li alloy as an anode which can provide a specific capacity that is about 10 times greater than that of a graphite anode. However, a lithium battery including a solid electrolyte and a Li metal or a Li alloy has safety problems, e.g., short circuits due to the growth of lithium dendrites during charging of the lithium battery, and the like. In addition, a solid electrolyte for lithium batteries used in fields such as electric vehicles desirably provides high ionic conductivity.

In this regard, the inventors of the present disclosure have proposed a novel composite solid electrolyte.

A composite solid electrolyte according to an embodiment includes a lithium ion conductive solid electrolyte and a polymer-containing electrolyte coating layer on a surface of the lithium ion conductive solid electrolyte. The polymer-containing electrolyte coating layer may include an ion conductive polymer having an alkylene oxide-based segment.

The composite solid electrolyte is a composite electrolyte of the lithium ion conductive solid electrolyte and the polymer-containing electrolyte coating layer. An interfacial resistance between the composite solid electrolyte and an anode of a lithium battery may be reduced.

The composite solid electrolyte includes, on the surface of the lithium ion conductive solid electrolyte, an electrolyte coating layer including an ion conductive polymer having an alkylene oxide-based segment, and the composite solid electrolyte provides improved ionic conductivity at room temperature (e.g., 25° C.). A lithium battery including the composite solid electrolyte provides improved electrochemical stability at room temperature (e.g., 25° C.), which enables a stable operation thereof.

The polymer-containing electrolyte coating layer may have a thickness of about 100 micrometers (μm) or less. The thickness of the polymer-containing electrolyte coating layer may be, for example, about 90 μm or less, for example, about 80 μm or less, for example, about 70 μm or less, for example, about 60 μm or less, or, for example, about 50 μm or less. The thickness of the polymer-containing electrolyte coating layer may be from about 1 μm to about 50 μm, for example, from about 5 μm to about 50 μm, for example, from about 10 μm to about 45 μm. The thickness of the polymer-containing electrolyte coating layer may be, for example, from about 10 μm to about 40 μm.

When the thickness of the polymer-containing electrolyte coating layer is within the above ranges, the growth of lithium dendrites at a surface of an anode may be suppressed very effectively without a decrease in lithium ion conductivity at room temperature. Thus, an interfacial resistance between an anode and the composite solid electrolyte including the polymer-containing electrolyte coating layer having the thickness ranges described above, at room temperature may be significantly reduced.

The phrase "ion conductive polymer having an alkylene oxide-based segment" as used herein refers to an ion conductive polymer having an alkylene oxide chain structural unit in which alkylene groups and ether oxygen groups are alternately arranged.

The alkylene oxide chain structural unit may be included in a main chain of the ion conductive polymer, or may be included, in a grafted form, in the ion conductive polymer. For example, the alkylene oxide chain structural unit may be an alkylene oxide chain structural unit having 1 to 10 carbon atoms, for example, 1 to 8 carbon atoms, for example, 1 to 5 carbon atoms, for example, 1 to 4 carbon atoms. In some embodiments, the alkylene oxide chain structural unit may have a branch.

The ion conductive polymer may include a siloxane-based polymer or an acrylate-based polymer, in addition to the alkylene oxide-based polymer. The ion conductive polymer may comprise at least one selected from an alkylene oxide-based polymer blend, a siloxane-based polymer blend, and an acrylate-based polymer blend.

In particular, the ion conductive polymer may be at least one selected from polyethylene oxide (PEO), polypropylene oxide (PPO), polybutylene oxide (PBO), a PEO-PPO blend, a PEO-PBO blend, a PEO-PPO-PBO blend, a PEO-PPO block copolymer, a PEO-PBO block copolymer, a PEO-PPO-PBO block copolymer, a PBO-PEO-PBO block copolymer, a PEO-PBO-PEO block copolymer, PEO-grafted polymethyl methacrylate (PMMA), PPO-grafted PMMA, and PBO-grafted PMMA.

More particularly, the ion conductive polymer may be at least one selected from PEO, PPO, a PEO-PPO blend, a PEO-PPO block copolymer, and a PEO-PPO-PEO block copolymer.

The ion conductive polymer may have a weight average molecular weight (Mw) of from about 100,000 Daltons to about 1,000,000 Daltons. The weight average molecular weight (Mw) of the ion conductive polymer may be, for example, from about 200,000 Daltons to about 800,000 Daltons, for example, from about 300,000 Daltons to about 700,000 Daltons. The ion conductive polymer having the weight average molecular weight (Mw) within the ranges described above has an appropriate chain length, i.e., an appropriate degree of polymerization and thus may have enhanced ionic conductivity at room temperature. However, the weight average molecular weight (Mw) of the ion conductive polymer is not particularly limited to the above ranges and may be within any range that enhances the ionic conductivity of the lithium battery fabricated.

The polymer-containing electrolyte coating layer may further include at least one selected from inorganic particles and a solvate ionic liquid including a lithium salt and a glyme-based material. The composite solid electrolyte including the polymer-containing electrolyte coating layer may have enhanced mechanical and physical properties, e.g., a Young's modulus of $1 \times 10^6$ megaPascals (MPa) or more at room temperature and enhanced ionic conductivity at room temperature.

The inorganic particles serve as a filler and, while not wanting to be bound by theory, are understood to hinder crystallization of the composite solid electrolyte, which results in enhanced ionic conductivity. The inorganic particles may also enhance mechanical and physical properties.

The inorganic particles may include at least one selected from $BaTiO_3$, $Al_2O_3$, ZnO, $SiO_2$, $TiO_2$, $ZrO_2$, a zeolite, a metal-organic framework (MOF), and polyhedral oligomeric silsesquioxanes (POSS). For example, the inorganic particles may include at least one selected from $BaTiO_3$, $SiO_2$, $TiO_2$, and $ZrO_2$.

The inorganic particles may include inorganic particles that are surface-modified with an ionic salt and/or polyethylene glycol (PEG). Such surface-modified inorganic particles may provide improved stabilization of an interface reaction between the composite solid electrolyte and an anode.

The MOF may be a porous crystalline compound formed by chemically bonding metal ions or metal ion clusters together with an organic ligand.

A suitable metal ion for forming the MOF may be any metal ion that can form a coordinate bond or a covalent bond, wherein the metal ion provides suitable electrical stability and does not participate in an oxidation or reduction reaction during charging and discharging of an energy storage device.

The metal ions may include, for example, at least one selected from $Zn^{2+}$, $Ti^{3+}$, $Ti^{4+}$, $Fe^{2+}$, $Fe^{3+}$, $V^{4+}$, $V^{3+}$, $V^{2+}$, $Y^{3+}$, $Zr^{4+}$, $Cu^{2+}$, and $Al^{3+}$. In another embodiment, the metal ions may include an oxo-centered metal cluster ion including the above-listed metal ions.

The organic ligand may include any suitable organic material having a functional group capable of forming a coordinate, ionic, or covalent bond, such as a carboxylic acid group or imidazole group. A suitable organic ligand may include an organic material having at least two binding sites for coordinate, ionic or covalent bonding, e.g., bidentate, tridentate, or the like.

For example, the organic ligand may include at least one selected from an aromatic dicarboxylic acid, an aromatic tricarboxylic acid, and an imidazole-based compound.

Non-limiting examples of the aromatic dicarboxylic or tricarboxylic acid include benzenedicarboxylic acids such as benzene-1,2-dicarboxylic acid (or o-phthalic acid), benzene-1,3-dicarboxylic acid (or m-phthalic acid), and benzene-1,4-dicarboxylic acid (or ρ-phthalic acid); benzenetricarboxylic acid such as benzene-1,3,5-tricarboxylic acid (or trimesic acid); naphthalenedicarboxylic acid; biphenyldicarboxylic acid; and triphenyldicarboxylic acid. In some embodiments, the aromatic dicarboxylic or tricarboxylic acid may include a compound represented by one of Formulas A to E:

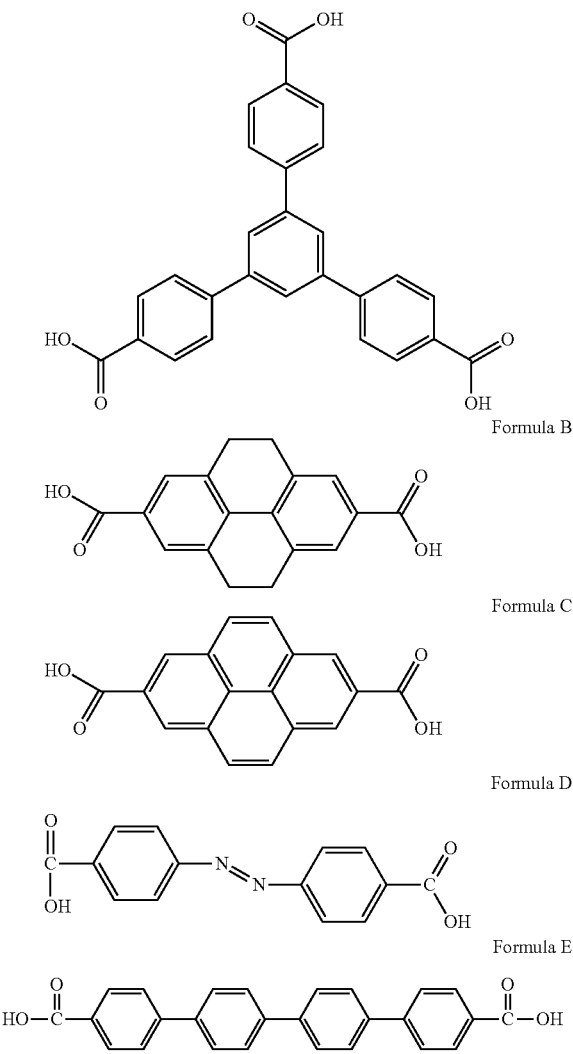

Formula A

Formula B

Formula C

Formula D

Formula E

The imidazole-based compound may be, for example, imidazole, benzoimidazole, or the like.

In particular, the MOF may be, for example, $Ti_8O_8(OH)_4[O_2C-C_6H_4-CO_2]_6$, $Cu(bpy)(H_2O)_2(BE_4)_2(bpy)$ {bpy=4,4'-bipyridine}, $Zn_4O(O_2C-C_6H_4-CO_2)_3$ (Zn-terephthalic acid-MOF, Zn-MOF), $Al(OH)\{O_2C-C_6H_4-CO_2\}$, or the like.

Pores in the porous crystalline compound may have an average diameter of from about 1 nanometer (nm) to about 10 nm. The average diameter of the pores may be, for example, from about 1 nm to about 8 nm. The average diameter of the pores may be, for example, from about 1 nm to about 5 nm. In particular, the MOF may have a mesoporous structure, and may have an average pore diameter of about 1 nm to about 50 nm, or about 1 nm to about 10 nm.

The MOF may have a specific surface area of about 100 square meters per gram ($m^2/g$) or more. For example, the specific surface area of the MOF may be about 500 $m^2/g$ or more. For example, the specific surface area of the MOF may be about 1000 $m^2/g$ or more, such as 100 $m^2/g$ to 10,000 $m^2/g$, or 500 $m^2/g$ to 5000 $m^2/g$. The MOF has a large specific surface area within the ranges described above and thus may have enhanced ionic conductivity at room temperature. The surface properties may be determined by nitrogen adsorption, for example.

The POSS may have a cage structure. The POSS having a cage structure may contain 8 silicon atoms or less, for example, 6 silicon atoms or 8 silicon atoms. The POSS having a cage structure may be a compound represented by Formula F or G:

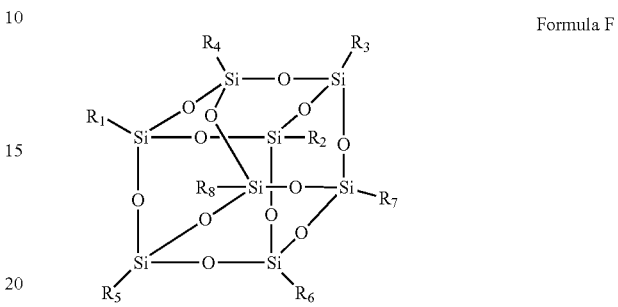

Formula F wherein each of $R_1$ to $R_8$ is independently hydrogen, a substituted or unsubstituted $C_1$-$C_{30}$ alkyl group, a substituted or unsubstituted $C_1$-$C_{30}$ alkoxy group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_6$-$C_{30}$ aryloxy group, a substituted or unsubstituted $C_2$-$C_{30}$ heteroaryl group, a substituted or unsubstituted $C_4$-$C_{30}$ carbocyclic group, or a silicon-containing functional group,

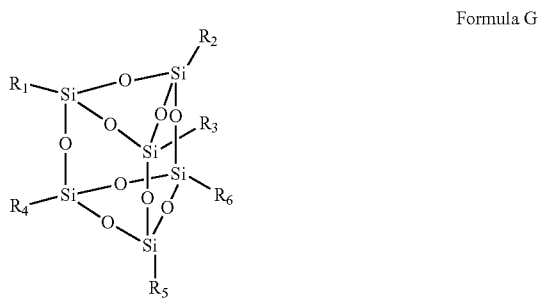

Formula G wherein each of $R_1$ to $R_6$ is independently hydrogen, a substituted or unsubstituted $C_1$-$C_{30}$ alkyl group, a substituted or unsubstituted $C_1$-$C_{30}$ alkoxy group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_6$-$C_{30}$ aryloxy group, a substituted or unsubstituted $C_2$-$C_{30}$ heteroaryl group, a substituted or unsubstituted $C_4$-$C_{30}$ carbocyclic group, or a silicon-containing functional group.

In particular, the POSS having a cage structure may be, for example, heptaisobutyl-t8-silsesquioxane.

Substituents and functional groups used in the compound of Formula F or G are defined as follows.

The term "substituted" as used herein means substitution with a halogen atom, a $C_1$-$C_{20}$ alkyl group substituted with a halogen atom (e.g., $CCF_3$, $CHCF_2$, $CH_2F$, $CCl_3$, or the like), a $C_1$-$C_{20}$ alkoxy group, a $C_2$-$C_{20}$ alkoxyalkyl group, a hydroxyl group, a nitro group, a cyano group, an amino group, an amidino group, a hydrazine, a hydrazone, a carboxyl group or a salt thereof, a sulfonyl group, a sulfamoyl group, a sulfonic acid or a salt thereof, a phosphoric acid or a salt thereof, a $C_1$-$C_{20}$ alkyl group, a $C_2$-$C_{20}$ alkenyl group, a $C_2$-$C_{20}$ alkynyl group, a $C_1$-$C_{20}$ heteroalkyl group, a $C_6$-$C_{20}$ aryl group, a $C_6$-$C_{20}$ arylalkyl group, a $C_6$-$C_{20}$ heteroaryl group, a $C_7$-$C_{20}$ heteroarylalkyl group, a $C_6$-$C_{20}$ heteroaryloxy group, a $C_6$-$C_{20}$ heteroaryloxyalkyl group, or a $C_6$-$C_{20}$ heteroarylalkyl group.

The term "halogen atom" as used herein includes fluorine, bromine, chlorine, iodine, and the like.

The term "alkyl" used herein refers to a fully saturated branched or unbranched (straight chain or linear) hydrocarbon group. Non-limiting examples of "alkyl" include methyl, ethyl, n-propyl, isopropyl, n-butyl, isobutyl, sec-butyl, n-pentyl, isopentyl, neopentyl, iso-amyl, n-hexyl, 3-methylhexyl, 2,2-dimethylpentyl, 2,3-dimethylpentyl, and n-heptyl.

The terms "alkoxyl" and "aryloxy" respectively mean alkyl or aryl bound to an oxygen atom.

The term "alkenyl" as used herein refers to a branched or unbranched hydrocarbon group having at least one carbon-carbon double bond. Non-limiting examples of the alkenyl group include vinyl, allyl, butenyl, isopropenyl, and isobutenyl.

The term "alkynyl" as used herein refers to a branched or unbranched hydrocarbon group having at least one carbon-carbon triple bond. Non-limiting examples of the alkynyl group include ethynyl, butynyl, isobutynyl, and isopropynyl.

The term "aryl" as used herein also includes a group with an aromatic ring fused to at least one carbocyclic group. Non-limiting examples of the aryl group include phenyl, naphthyl, and tetrahydronaphthyl.

The term "heteroaryl" as used herein indicates a monocyclic or bicyclic organic compound including at least one heteroatom selected from N, O, P, and S, wherein the rest of the cyclic atoms are all carbon. The heteroaryl group may include, for example, one to five heteroatoms and may include five- to ten-membered rings. In the heteroaryl group, S or N may be present in various oxidized forms.

Non-limiting examples of the heteroaryl group include thienyl, furyl, pyrrolyl, imidazolyl, pyrazolyl, thiazolyl, isothiazolyl, 1,2,3-oxadiazolyl, 1,2,4-oxadiazolyl, 1,2,5-oxadiazolyl, 1,3,4-oxadiazolyl, 1,2,3-thiadiazolyl, 1,2,4-thiadiazolyl, 1,2,5-thiadiazolyl, 1,3,4-thiadiazolyl, isothiazol-3-yl, isothiazol-4-yl, isothiazol-5-yl, oxazol-2-yl, oxazol-4-yl group, an oxazol-5-yl group, an isoxazol-3-yl group, an isoxazol-4-yl group, an isoxazol-5-yl, 1,2,4-triazol-3-yl, 1,2,4-triazol-5-yl, 1,2,3-triazol-4-yl, 1,2,3-triazol-5-yl, tetrazolyl, pyrid-2-yl, pyrid-3-yl, 2-pyrazin-2-yl, pyrazin-4-yl, pyrazin-5-yl, 2-pyrimidin-2-yl, 4-pyrimidin-2-yl, and 5-pyrimidin-2-yl.

The term "carbocyclic" as used herein refers to saturated or partially unsaturated non-aromatic monocyclic, bicyclic or tricyclic hydrocarbon groups. Non-limiting examples of the monocyclic hydrocarbon groups include cyclopentyl, cyclopentenyl, cyclohexyl, and cyclohexenyl. Non-limiting examples of the bicyclic hydrocarbon groups include bornyl, decahydronaphthyl, bicyclo[2.1.1]hexyl, bicyclo[2.2.1]heptyl, bicyclo[2.2.1]heptenyl, and bicyclo[2.2.2]octyl. The tricyclic hydrocarbon groups may be, for example, adamantyl and the like.

The term "heterocyclic" as used herein refers to a cyclic hydrocarbon group having at least one heteroatom and 5 to 20 carbon atoms, for example, 5 to 10 carbon atoms. In this regard, the heteroatom may be one selected from sulfur, nitrogen, oxygen, and boron.

The inorganic particles may have a particle diameter of about 500 nm or less. For example, the particle diameter of the inorganic particles may be from about 5 nm to about 500 nm. When the particle diameter of the inorganic particles is within the above ranges, a composite solid electrolyte having excellent film formation properties without deterioration of ionic conductivity and excellent mechanical and physical properties may be prepared.

The amount of the inorganic particles may be from about 5 wt % to about 15 wt %, based on a total weight of the ion conductive polymer. For example, the amount of the inorganic particles may be from about 7 wt % to about 13 wt %, based on the total weight of the ion conductive polymer. When the amount of the inorganic particles is within the above ranges, the composite solid electrolyte may have enhanced mechanical and physical properties. In addition, the composite solid electrolyte has a reduced crystallizability and thus may have high ionic conductivity and electrochemical stability at room temperature.

The solvate ionic liquid includes a lithium salt and a glyme-based material.

The glyme-based material may be, for example, at least one selected from a monoglyme, a diglyme, a triglyme, and a tetraglyme. In particular, the glyme-based material may be, for example, triethylene glycol dimethyl ether (triglyme) or tetraethylene glycol dimethyl ether (tetraglyme). The glyme-based material may form a highly stable coordinate compound, for example, when containing four or five oxygen atoms and thus coordinating with lithium.

The alkylene oxide-based segment included in the polymer-containing electrolyte coating layer contains oxygen and thus may coordinate with lithium. As such, due to the coordination with lithium, transfer of lithium ions in the electrolyte may be partially hindered.

Figure 2:
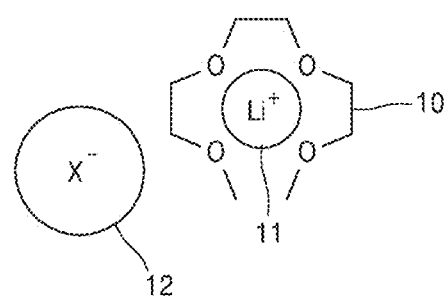
FIG. 2 is a schematic view illustrating a structure of a solvate ionic liquid according to an embodiment.

However, as illustrated in FIG. 2, the composite solid electrolyte includes a solvate ionic liquid having a structure in which oxygen of a glyme-based material 10 coordinates with lithium 11 of the lithium salt and an anion $X^-$ 12 of the lithium salt is present, and thus may have enhanced lithium ion mobility. In this regard, $X^-$ may be, for example, fluorosulfonylimide ($FSI^-$) or (trifluoromethane)sulfonimide ($TFSI^-$).

When the composite solid electrolyte includes the solvate ionic liquid, coordinate bonding between the alkylene oxide-based segment and lithium ions is excessively formed, as compared to when an electrolyte does not include the solvate ionic liquid, and thus hindrance of the transfer of lithium ions may be effectively prevented. As a result, coordinate bonding between lithium and a glyme (i.e., glyme-based material) is formed and thus a composite solid electrolyte having improved electrochemical stability and high ionic conductivity at a surface of a Li electrode may be obtained.

In addition, the solvate ionic liquid, which is one of the Lewis bases, has a great effect on stabilizing a surface of a Li metal and on suppressing the growth of lithium dendrites at the surface of the Li metal.

In the solvate ionic liquid, a molar ratio of the lithium salt and the glyme-based material may be from about 1:1 to about 1:4, for example, from about 1:1 to about 1:2. The molar ratio within the above ranges enables the formation of the solvate ionic liquid.

A mixing ratio of the alkylene oxide-based segment and the solvate ionic liquid may be from about 5:1 to about 20:1, for example, from about 10:1 to about 15:1, on a molar ratio basis.

The polymer-containing electrolyte coating layer may further include at least one selected from an ionic liquid, which can be a polymeric ionic liquid, and an oligomer.

The term "ionic liquid" as used herein refers to a salt in a liquid state at room temperature or a room-temperature molten salt that has a melting point that is equal to or less than room temperature and is composed solely of ions.

The ionic liquid may be at least one compound selected from compounds having: at least one cation selected from an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, and a triazole-based cation; and at least one anion selected from $BF_4^-$, $PF_6^-$, $ASF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, and $(C_2F_5SO_2)(CF_3SO_2)N^-$.

The ionic liquid may be, for example, at least one selected from N-methyl-N-propylpyrrolidinium bis(trifluoromethanesulfonyl)imide, N-butyl-N-methylpyrrolidinium bis(3-trifluoromethylsulfonyl)imide, 1-butyl-3-methylimidazolium bis(trifluoromethylsulfonyl)imide, and 1-ethyl-3-methylimidazolium bis(trifluoromethylsulfonyl)imide.

The amount of the ionic liquid may be from about 5 wt % to about 40 wt %, for example, from about 10 wt % to about 20 wt %, based on the total weight of the ion conductive polymer. When the amount of the ionic liquid is within the above ranges, a composite solid electrolyte having excellent ionic conductivity and mechanical and physical properties may be obtained.

The polymeric ionic liquid may be a polymeric ionic liquid obtained by polymerization of ionic liquid monomers or a compound obtained in a polymeric form. Such polymeric ionic liquid has a high solubility for an organic solvent and may have increased ionic conductivity when added to an electrolyte. As for the polymeric ionic liquid obtained by polymerization of ionic liquid monomers, the resultant obtained after the polymerization reaction can be washed and dried, followed by anion substitution so as to have an appropriate anion capable of imparting solubility for an organic solvent.

The polymeric ionic liquid may have a repeating unit having: at least one cation selected from an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, and a triazole-based cation; and at least one anion selected from $BF_4^-$, $PF_6^-$, $AsF_6^-$, $SbF_6^-$, $AlCl_4^-$, $HSO_4^-$, $ClO_4^-$, $CH_3SO_3^-$, $CF_3CO_2^-$, $(CF_3SO_2)_2N^-$, $(FSO_2)_2N^-$, $Cl^-$, $Br^-$, $I^-$, $SO_4^-$, $CF_3SO_3^-$, $(C_2F_5SO_2)_2N^-$, $(C_2F_5SO_2)(CF_3SO_2)N^-$, $NO_3^-$, $Al_2Cl_7^-$, $(CF_3SO_2)_3C^-$, $(CF_3)_2PF_4^-$, $(CF_3)_3PF_3^-$, $(CF_3)_4PF_2^-$, $(CF_3)_5PF^-$, $(CF_3)_6P^-$, $SF_5CF_2SO_3^-$, $SF_5CHFCF_2SO_3^-$, $CF_3CF_2(CF_3)_2CO^-$, $(CF_3SO_2)_2CH^-$, $(SF_5)_3C^-$, and $(O(CF_3)_2C_2(CF_3)_2O)_2PO^-$.

In some embodiments, the polymeric ionic liquid may be prepared by polymerizing an ionic liquid monomer. The ionic liquid monomer can have a functional group that is polymerizable with a vinyl group, an allyl group, an acrylate group, a methacrylate group, or the like and may also have the aforementioned anion and at least one cation selected from an ammonium-based cation, a pyrrolidinium-based cation, a pyridinium-based cation, a pyrimidinium-based cation, an imidazolium-based cation, a piperidinium-based cation, a pyrazolium-based cation, an oxazolium-based cation, a pyridazinium-based cation, a phosphonium-based cation, a sulfonium-based cation, and a triazole-based cation.

Examples of the ionic liquid monomer include 1-vinyl-3-ethylimidazolium bromide and compounds represented by Formulas H and I:

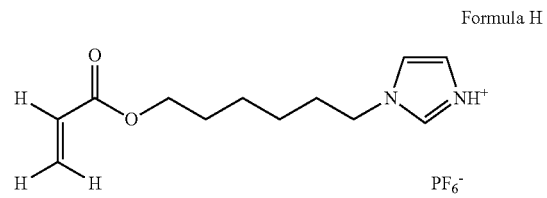

Formula H

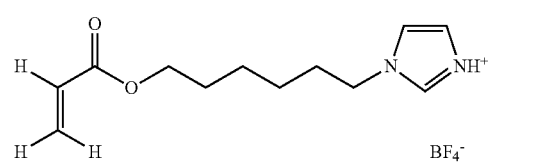

Formula I

The polymeric ionic liquid described above may be, for example, a compound represented by Formula J or a compound represented by Formula K:

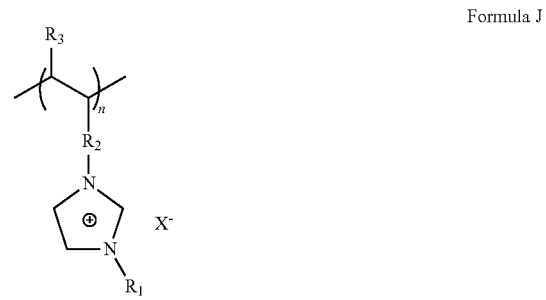

Formula J wherein each of $R_1$ and $R_3$ is independently hydrogen, a substituted or unsubstituted $C_1$-$C_{30}$ alkyl group, a substituted or unsubstituted $C_2$-$C_{30}$ alkenyl group, a substituted or unsubstituted $C_2$-$C_{30}$ alkynyl group, a substituted or unsubstituted $C_6$-$C_{30}$ aryl group, a substituted or unsubstituted $C_2$-$C_{30}$ heteroaryl group, or a substituted or unsubstituted $C_4$-$C_{30}$ carbocyclic group, $R_2$ denotes simply a chemical bond or is a $C_1$-$C_3$ alkylene group, a $C_6$-$C_{30}$ arylene group, a $C_2$-$C_{30}$ heteroarylene group, or a $C_4$-$C_{30}$ carbocyclic group, $X^-$ is an anion of an ionic liquid, and n is 500 to 2800,

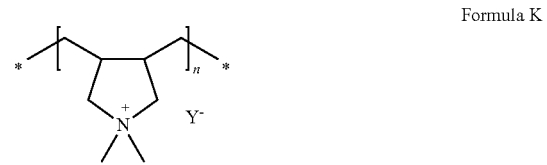

Formula K wherein $Y^-$ is defined the same as for $X^-$ of Formula J, and n is 500 to 2800.

In Formula K above, $Y^-$ may be, for example, bis(trifluoromethanesulfonyl)imide (TFSI), bis(fluoromethanesulfonyl)imide, $BF_4^-$, or $CF_3SO_3^-$.

The polymeric ionic liquid includes, for example, a cation selected from poly(1-vinyl-3-alkylimidazolium), poly(1-allyl-3-alkylimidazolium), and poly(1-(methacryloyloxy-3-alkylimidazolium) and an anion selected from $CH_3COO^-$, $CF_3COO^-$, $CH_3SO_3^-$, $CF_3SO_3^-$, $(CF_3SO_2)_2N^-$, $(FSO_2)_2N^-$, $(CF_3SO_2)_3C^-$, $(CF_3CF_2SO_2)_2N^-$, $C_4F_9SO_3^-$, $C_3F_7COO^-$, and $(CF_3SO_2)(CF_3CO)N^-$.

The compound of Formula K may be, for example, polydiallyldimethylammonium bis(trifluoromethanesulfonyl)imide.

Substituents and functional groups used in the compound of Formula J or K are defined the same as for the compound of Formula F or G.

The lithium ion conductive solid electrolyte may be at least one selected from ceramic composites represented by Formulas 1 and 2 below:

$$Li_{1+x}Al_y(M1)_z(M2)_wP_{3+s}O_{12+t} \qquad \text{Formula 1}$$

wherein M1 may be titanium (Ti) or germanium (Ge),

M2 may be at least one selected from titanium (Ti), tantalum (Ta), and zirconium (Zr), and $0 \le x \le 1$, $0 \le y \le 1$, $0 \le z \le 1$, $0 \le w \le 2$, $0 \le s \le 1$, and $0 \le t \le 1$.

$$Li_{7-a}La_{3-a}(M3)_aZr_{2+b}O_{12+c} \qquad \text{Formula 2}$$

wherein M3 may be at least one selected from aluminum (Al) and cerium (Ce), $0 \le a \le 1$, $0 \le b \le 1$, and $0 \le c \le 1$.

The ceramic composite is a lithium ion conductive ceramic composite is substantially or effectively impermeable to a liquid electrolyte, and thus may not allow a liquid electrolyte to permeate therethrough. The ceramic composite substantially or effectively prevents a cathode or an electrolyte component from reacting with an anode and substantially or effectively prevents an electrical short circuit between a cathode and an anode even when lithium dendrites are formed at a surface of the anode.

The ceramic composite of Formula 1 may be a NASICON-type composite. The ceramic composite of Formula 1 may be obtained by, for example, doping a Li—Ti—Al—$PO_4$-based ceramic base compound with at least one inorganic oxide selected from $TiO_2$, $ZnO_2$, and $GeO_2$, and sintering the doped compound. Such inorganic oxide, e.g., $TiO_2$, $ZnO_2$, $GeO_2$, or the like, has insulating properties, and becomes conductive (i.e., loses the insulating effect) when added to a Li—Ti—Al—$PO_4$-based ceramic compound and sintered together so that the inorganic oxide is doped in the Li—Ti—Al—$PO_4$ main backbone to form a ceramic composite. In this regard, this material may be distinguished from a product of simple mixing. The ceramic composite obtained by doping with the inorganic oxide and sintering the doped compound may have increased ionic conductivity, as compared to an undoped ceramic base compound.

In particular, the ceramic composite of Formula 1 may be, for example, at least one selected from $Li_{1.4}Al_{0.4}Ge_{0.2}Ti_{1.4}(PO_4)_3$ (LAGTP), $Li_{1.6}Al_{0.5}Ti_{0.95}Ta_{0.5}(PO_4)_3$ (LATTP), $Li_{1.6}Al_{0.5}Ge_{1.5}(PO_4)_3$ (LAGP), $Li_{1.5}Al_{0.5}Ti_{1.5}(PO_4)_3$ (LATP), and $Li_7La_3Zr_2O_{12}$ (LLZO).

The ceramic composite of Formula 2 may be a tetragonal phase and/or cubic phase garnet-type composite. For example, the ceramic composite of Formula 2 may be a cubic phase garnet-type composite. The cubic phase garnet-type ceramic composite may be obtained by doping and substituting with an element such as Al, Ta, calcium (Ca), niobium (Nb), or the like and sintering the resultant at a heat treatment temperature of 1000° C. or less. Such cubic phase garnet-type ceramic composite may have a higher ionic conductivity at room temperature than an undoped ceramic base compound.

The lithium ion conductive solid electrolyte may have a thickness of from about 1 μm to about 500 μm, for example, from about 10 μm to about 500 μm.

The lithium ion conductive solid electrolyte may be porous.

The lithium ion conductive solid electrolyte may further include a crosslinkable polymer filled in pores thereof. The crosslinkable polymer may include, for example, at least one selected from epoxy resin, acryl resin, polyamide resin, polyimide resin, polyimide amide resin, polycarbonate resin, polyester resin, phenol resin, polyurethane resin, and melamine resin.

The amount of the crosslinkable polymer may be from about 0.01 wt % to about 20 wt %, for example, from about 0.01 wt % to about 10 wt %, based on the total weight of the lithium ion conductive solid electrolyte. When the amount of the crosslinkable polymer is within the above ranges, permeation of liquid components and/or impurities into the lithium ion conductive solid electrolyte may be suppressed.

The composite solid electrolyte may have an ionic conductivity of $1 \times 10^{-4}$ S/cm or more at 25° C.

Protected Anode and Lithium Battery

A protected anode according to another embodiment includes, as illustrated in FIG. 1, an anode 1 including a Li metal or a Li alloy and the composite solid electrolyte, which comprises the lithium ion conductive solid electrolyte 2 and polymer-containing electrolyte coating layer 3. The polymer-containing electrolyte coating layer 3 of the composite solid electrolyte may contact the anode 1.

The polymer-containing electrolyte coating layer 3 of the composite solid electrolyte acts as a protective film for the anode 1 between the lithium ion conductive solid electrolyte 2 and the anode 1.

In a Nyquist plot obtained from impedance measurement of the protected anode, an interfacial resistance $R_i$ between the anode and the composite solid electrolyte may decrease by about 400% or more, for example, about 450% or more, for example, about 460% or more at 25° C., as compared to that between the anode and the lithium ion conductive solid electrolyte.

A surface of the protected anode may not have a dendrite, e.g., a lithium dendrite, after treatment of the protected anode at 25° C. and a current density of 1.0 mA/cm² for up to 40 hours. A lithium battery including the protected anode is operable at 25° C. In an embodiment, after treatment of the protected anode at 25° C. and at a current density of 1.0 mA/cm² for 40 hours a surface of the protected anode does not have a dendrite, e.g., a lithium dendrite when analyzed by optical microscopy.

A lithium battery according to another embodiment may include the protected anode described above and a cathode 21. The lithium battery may be a solid state lithium battery and may not comprise a solvent, such as a carbonate solvent.

Figure 3A:
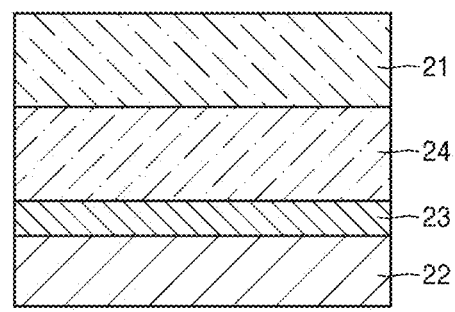
FIGS. 3A and 3B are schematic views illustrating structures of lithium batteries according to embodiments.
Figure 3B:
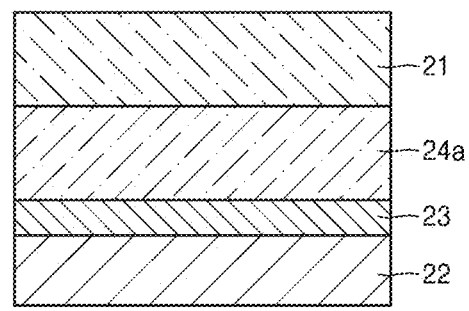

As illustrated in FIGS. 3A and 3B, a composite solid electrolyte 23 is disposed on an anode 22, and a polymer-containing electrolyte coating layer of the composite solid electrolyte 23 acts as a protective film for the anode 22.

The lithium battery may further include an intermediate layer 24 between the protected anode and the cathode 21. The intermediate layer 24 may be, as illustrated in FIG. 3B, a separator 24a.

The separator 24a may be a single layer of polyethylene, polypropylene, or polyvinylidene fluoride, or multiple layers of at least two of these materials. Also, the separator 24a may be a mixed multi-layer, such as two layers of polyethylene/polypropylene, three layers of polyethylene/polypropylene/polyethylene, three layers of polypropylene/polyethylene/polypropylene, or the like. The separator 24a may further include an electrolyte including a lithium salt and an organic solvent.

The intermediate layer 24 may be at least one intermediate layer selected from the separator 24a and a liquid electrolyte. The intermediate layer 24 may have a double-layered structure in which the composite solid electrolyte 23 and the liquid electrolyte are sequentially stacked from the anode 22. The lithium battery has a stacking order of anode/composite solid electrolyte/intermediate layer (liquid electrolyte)/cathode. In some embodiments, a commercially available solid electrolyte may be used in the intermediate layer 24 of the lithium battery.

The liquid electrolyte includes a solvent and a lithium salt.

The solvent may further include at least one selected from an aprotic solvent and water.

The aprotic solvent may be, for example, a carbonate-based solvent, an ester-based solvent, an ether-based solvent, a ketone-based solvent, an amine-based solvent, or a phosphine-based solvent.

Non-limiting examples of the carbonate-based solvent include dimethyl carbonate (DMC), diethyl carbonate (DEC), ethyl methyl carbonate (EMC), dipropyl carbonate (DPC), methyl propyl carbonate (MPC), ethyl propyl carbonate (EPC), methyl ethyl carbonate (MEC), ethylene carbonate (EC), propylene carbonate (PC), and butylene carbonate (BC).

Non-limiting examples of the ester-based solvent include methyl acetate, ethyl acetate, n-propyl acetate, dimethyl acetate, methyl propionate, ethyl propionate, γ-butyrolactone, decanolide, valerolactone, mevalonolactone, and caprolactone.

Non-limiting examples of the ether-based solvent include dibutyl ether, tetraglyme, diglyme, dimethoxyethane, 2-methyl tetrahydrofuran, and tetrahydrofuran, and the ketone-based solvent may be, for example, cyclohexanone or the like.

In addition, the amine-based solvent may be triethylamine, triphenylamine, or the like. The phosphine-based solvent may be, for example, triethylphosphine, or the like. However, the solvent is not particularly limited to the above examples and any suitable aprotic solvent that may be used in the art may be used.

Non-limiting examples of the aprotic solvent include nitriles represented by R—CN, where R is a linear, branched, or cyclic hydrocarbon group having 2 to 20 carbon atoms, amides such as dimethyl formamide, dioxolanes such as 1,3-dioxolane, and sulfolanes.

The aprotic solvents described above may be used alone or at least one of these solvents may be used in combination. If one or more of these solvents are combined, a mixing ratio may be appropriately adjusted according to the desired performance of the battery to be manufactured, the details of which are either know by those of skill in the art or can be determined without undue experimentation.

In some embodiments, the liquid electrolyte may include an ionic liquid.

The ionic liquid may be a compound composed of a linear or branched substituted ammonium, imidazolium, pyrrolidinium or piperidinium cation and an anion such as $PF_6^-$, $BF_4^-$, $CF_3SO_3^-$, $(CF_3SO_2)_2N^-$, $(C_2F_5SO_2)_2N^-$, $(C_2F_5SO_2)_2N^-$, $(CN)_2N^-$, or the like.

The lithium battery may be a lithium metal battery or a lithium air battery.

Figure 4:
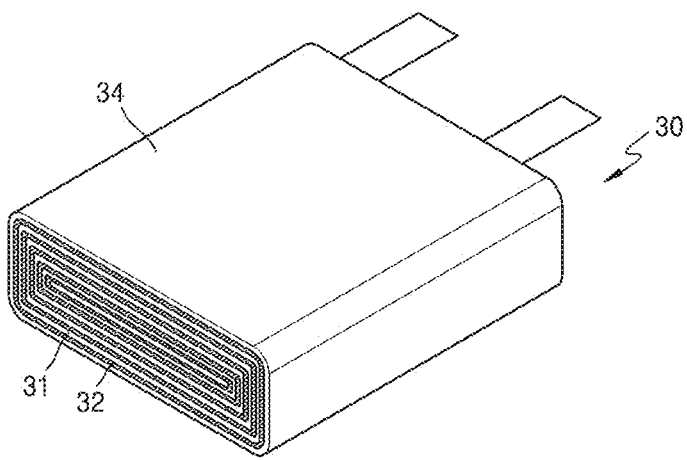
FIG. 4 is a schematic view illustrating a structure of a lithium metal battery according to an embodiment.

FIG. 4 is a schematic view illustrating a structure of a lithium metal battery 30 according to an embodiment.

As illustrated in FIG. 4, the lithium metal battery 30 includes a cathode 31, an anode 32, and a battery can 34 to accommodate the cathode 31 and the anode 32.

The anode 32 may be an anode including a lithium metal or a lithium alloy.

The cathode 31 may be fabricated by coating a cathode active material on a surface of a cathode current collector formed of a material such as Al or the like. In another embodiment, the cathode 31 may be manufactured by casting the cathode active material on a separate support and laminating a cathode active material film separated from the support on the current collector.

The cathode active material may be a compound capable of intercalating/deintercalating lithium, inorganic sulfur ($S_8$), or a sulfur-based compound.

The compound capable of intercalating/deintercalating lithium may be, for example, a compound represented by at least one selected from the Formulas: $Li_aA_{1-b}B'_bD'_2$ where $0.90 \leq a \leq 1.8$ and $0 \leq b \leq 0.5$; $Li_aE_{1-b}B'_bO_{2-c}D'_c$ where $0.90 \leq a \leq 1.8$, $0 \leq b \leq 0.5$, and $0 \leq c \leq 0.05$; $LiE_{2-b}B'_bO_{4-c}D'_c$ where $0 \leq b \leq 0.5$ and $0 \leq c \leq 0.05$; $Li_aNi_{1-b-c}Co_bB'_cD'_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Co_bB'_cO_{2-\alpha}F'_\alpha$ where $0.90 \leq a \leq 1.8$, $0 \leq b \leq 0.5$, $0 \leq c \leq 0.05$, and $0 < \alpha < 2$; $Li_aNi_{1-b-c}Mn_bB'_cD'_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Mn_bB'_cO_{2-\alpha}F'_\alpha$ where $0.90 \leq a \leq 1.8$, $0 \leq b \leq 0.5$, $0 \leq c \leq 0.05$, and $0 < \alpha < 2$; $Li_aNi_bE_cG_dO_2$ where $0.90 \leq a \leq 1.8$, $0 \leq b \leq 0.9$, $0 \leq c \leq 0.5$, and $0.001 \leq d \leq 0.1$; $Li_aNi_bCo_cMn_dG_eO_2$ where $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ where $0.90 \leq a \leq 1.8$ and $0.001 \leq b \leq 0.1$; $Li_aCoG_bO_2$ where $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2G_bO_4$ where $0.90 \leq a \leq 1.8$ and $0.001 \leq b \leq 0.1$; $QO_2$; $QS_2$; $LiQS_2$; $V_2O_5$; $LiV_2O_5$; $LiI'O_2$; $LiNiVO_4$; $Li_{(3-f)}J_2(PO_4)_3 (0 \leq f \leq 2)$; $Li_{(3-f)}Fe_2(PO_4)_3 (0 \leq f \leq 2)$; and $LiFePO_4$.

In the formulas above, A is nickel (Ni), cobalt (Co), manganese (Mn), or a combination thereof; B' is Al, Ni, Co, Mn, chromium (Cr), iron (Fe), magnesium (Mg), strontium (Sr), vanadium (V), a rare earth element, or a combination thereof; D' is oxygen (O), fluorine (F), sulfur (S), phosphorous (P), or a combination thereof; E is Co, Mn, or a combination thereof; F' is F, S, P, or a combination thereof; G is Al, Cr, Mn, Fe, Mg, lanthanum (La), cerium (Ce), Sr, V, or a combination thereof; Q is Ti, molybdenum (Mo), Mn, or a combination thereof; I' is Cr, V, Fe, scandium (Sc), yttrium (Y), or a combination thereof; and J is V, Cr, Mn, Co, Ni, copper (Cu), or a combination thereof.

The sulfur-based compound may be, for example, at least one selected from a sulfide compound, an organic sulfur compound, and a carbon-sulfur polymer. Non-limiting examples of the sulfide compound include $Li_2S_n$ where $n \geq 1$, 2,5-dimercapto-1,3,4-thiadiazole, and 1,3,5-trithiocyanuric acid. The carbon-sulfur polymer may be, for example, $C_2S_x$ where $x = 2.5$ to 50 and $n \geq 2$, or the like.

The cathode active material may further include a binder and a conductive agent.

Examples of the binder include, but are not limited to, polyethylene, polypropylene, polytetrafluoroethylene (PTFE), polyvinylidene fluoride (PVDF), styrene-butadiene rubber, a tetrafluoroethylene-perfluoroalkylvinylether copolymer, a vinylidene fluoride-hexafluoropropylene copolymer, a vinylidene fluoride-chlorotrifluoroethylene copolymer, an ethylene-tetrafluoroethylene copolymer, polychlorotrifluoroethylene, a vinylidene fluoride-pentafluoro propylene copolymer, a propylene-tetrafluoroethylene copolymer, an ethylene-chlorotrifluoroethylene copolymer, a vinylidene fluoride-hexafluoropropylene-tetrafluoroethylene copolymer, a vinylidene fluoride-perfluoromethylvinylether-tetrafluoro ethylene copolymer, and an ethylene-acrylic acid copolymer. The binder materials listed may be used alone or in combination. However, any suitable binder available in the art may be used.

Examples of the conductive agent include carbon black, graphite particulates, natural graphite, artificial graphite, acetylene black, Ketjen black, carbon fibers; carbon nanotubes, metallic powders, fibers or tubes formed of copper, nickel, aluminum, or silver, and conductive polymers such as polyphenylene derivatives, but the conductive agent is not limited to the above examples. For example, any suitable conductive agent used in the art may be used.

In another embodiment, a sulfur- or organic sulfur-free cathode may be manufactured and a catholyte prepared by adding a sulfur-containing cathode active material to an electrolyte may be used in the cathode.

The composite solid electrolyte described above is included between the anode 32 and the cathode 31. In some embodiments, the lithium metal battery may include, between the cathode 31 and the composite solid electrolyte, a liquid electrolyte, a polymer electrolyte, and/or a separator.

The liquid electrolyte includes a non-aqueous organic solvent and a lithium salt, and the non-aqueous organic solvent may be a single solvent or a mixture of two or more organic solvents. When using the mixture of two or more organic solvents, at least one solvent selected from at least two groups among a weak polar solvent group, a strong polar solvent group, and a lithium metal protecting solvent group may be used.

The weak polar solvent is defined as a solvent having a dielectric constant of less than 15, which is selected from an aryl compound, a bicyclic ether, and an acyclic carbonate, and also can dissolve a sulfur atom.

The strong polar solvent is defined as a solvent having a dielectric constant of greater than 15, which is selected from an acyclic carbonate, a sulfoxide compound, a lactone compound, a ketone compound, an ester compound, a sulfate compound, and a sulfite compound, and also can dissolve lithium polysulfide.

The lithium protecting solvent is defined as a solvent that has a charging/discharging cycle efficiency of 50% or more and forms a lithium metal stable-solid electrolyte interface (SEI) film, such as a saturated ether compound, an unsaturated ether compound, a heterocyclic compound containing N, O, S, or a combination thereof.

In particular, the weak polar solvent may be, for example, xylene, dimethoxyethane, 2-methyltetrahydrofuran, diethyl carbonate, dimethyl carbonate, toluene, dimethyl ether, diethyl ether, diglyme, tetraglyme, or the like.

In particular, the strong polar solvent may be, for example, hexamethyl phosphoric triamide, γ-butyrolactone, acetonitrile, ethylene carbonate, propylene carbonate, N-methylpyrrolidone, 3-methyl-2-oxazolidone, dimethyl formamide, sulfolane, dimethyl acetamide, dimethyl sulfoxide, dimethyl sulfate, ethylene glycol diacetate, dimethyl sulfite, ethylene glycol sulfite, or the like.

In particular, the lithium protecting solvent may be, for example, tetrahydrofuran, ethylene oxide, dioxolane, 3,5-dimethyl isoxazole, 2,5-dimehtyl furan, furan, 2-methyl furan, 1,4-oxane, 4-methyldioxolane, or the like.

The lithium salt may be at least one selected from lithium trifluoromethansulfonimide, lithium triflate, lithium perchlorate, $LiPF_6$, $LiBF_4$, tetraalkylammonium such as tetrabutylammonium tetrafluoroborate, and a salt, which is liquid at room temperature, e.g., an imidazolium salt such as 1-ethyl-3-methylimidazolium bis-(perfluoroethyl sulfonyl) imide. The concentration of the lithium salt in the electrolyte may be from about 0.1 molar (M) to about 2.0 M.

The lithium metal battery may be a unit battery having a cathode/separator/anode structure, a bicell having a cathode/separator/anode/separator/cathode structure, or a stack-type battery in which unit batteries are repeated.

Figure 5:
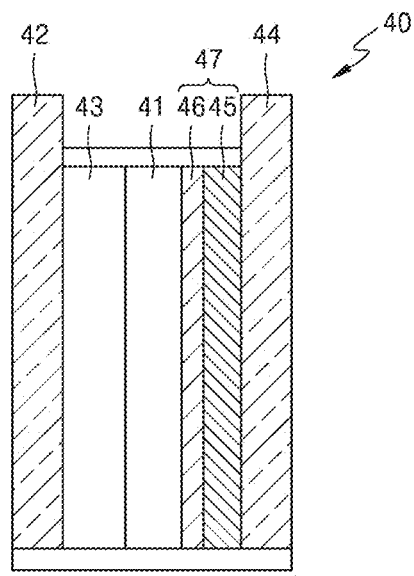
FIG. 5 is a schematic view illustrating a structure of a lithium air battery according to an embodiment.

FIG. 5 is a schematic view illustrating a structure of a lithium air battery 40 according to an embodiment.

As illustrated in FIG. 5, the lithium air battery 40 includes a cathode 43 formed on a first current collector 42 and using oxygen as an active material and a protected anode 47 adjacent to a second current collector 44. The protected anode 47 includes an anode 45 including a lithium metal or a lithium alloy and a polymer-containing electrolyte coating layer 46. The polymer-containing electrolyte coating layer 46 and a lithium ion conductive solid electrolyte 41 constitute a composite solid electrolyte 41 and 46.

An intermediate layer (not shown) is disposed between the cathode 43 and the composite solid electrolyte 41 and 46 and as described above, may further include at least one selected from a liquid electrolyte including a non-aqueous solvent and a lithium salt, an inorganic solid electrolyte membrane, a polymer solid electrolyte membrane, a gel-type polymer electrolyte membrane, and a separator.

The liquid electrolyte may be partially or completely impregnated in the cathode.

The liquid electrolyte and the separator may be the same liquid electrolyte and separator as described above. The aforementioned lithium ion conductive solid electrolyte may be used for the inorganic solid electrolyte membrane. The polymer solid electrolyte membrane may be, for example, a lithium salt-doped polyethyleneoxide, and the lithium salt may be, for example, $LiN(SO_2CF_2CF_3)_2$, $LiBF_4$, $LiPF_6$, $LiSbF_6$, $LiAsF_6$, $LiClO_4$, $LiCF_3SO_3$, $LiN(SO_2CF_3)_2$, $LiN(SO_2C_2F_5)_2$, $LiC(SO_2CF_3)_3$, $LiN(SO_3CF_3)_2$, $LiC_4F_9SO_3$, $LiAlCl_4$, or the like.

The polymer solid electrolyte membrane may form a stacked structure together with, for example, a glass-ceramic composite, and the glass-ceramic composite film may be disposed between two polymer solid electrolyte membranes.

The inorganic solid electrolyte membrane or the polymer solid electrolyte membrane may have a thickness of from about 1 micrometer (μm) to about 200 μm.

A catalyst for oxidation/reduction of oxygen may be added to the cathode 43. Examples of the catalyst include, but are not limited to, precious metal-based catalysts such as platinum, gold, silver, palladium, ruthenium, rhodium, and osmium; oxide-based catalysts such as a manganese oxide, an iron oxide, a cobalt oxide, and a nickel oxide; and an organic metal-based catalyst such as cobalt phthalocyanine. However, the catalyst is not particularly limited to the above examples and any catalyst for oxidation/reduction of oxygen used in the art may be used.

In addition, the catalyst may be supported on a catalyst support. The catalyst support may be an oxide, a zeolite, clay-based mineral, carbon, or the like. The oxide may include at least one oxide of alumina, silica, zirconium oxide, and titanium dioxide. The oxide may be an oxide including at least one metal selected from cerium (Ce), praseodymium (Pr), samarium (Sm), europium (Eu), terbium (Tb), thulium (Tm), ytterbium (Yb), antimony (Sb), bismuth (Bi), vanadium (V), chromium (Cr), manganese (Mn), iron (Fe), cobalt (Co), nickel (Ni), copper (Cu), niobium (Nb), molybdenum (Mo), and tungsten (W). Examples of the carbon include carbon blacks such as Ketjen black, acetylene black, channel black, and lamp black; a graphite such as natural graphite, artificial black, and expandable graphite; activated carbon; and carbon fiber. However, the carbon is not limited to the above examples and any suitable catalyst support used in the art may be used.

The cathode 43 may further include a binder.

The binder includes the aforementioned binder used in a lithium battery.

In an embodiment, the cathode 43 may be manufactured by preparing a cathode slurry by mixing the catalyst for oxidation/reduction of oxygen, a conductive material, and a binder together and adding an appropriate solvent thereto; coating a surface of a current collector with the cathode slurry; and drying the coated current collector, optionally followed by press-molding the current collector to improve electrode density. In addition, the cathode 43 may optionally include a lithium oxide. In addition, the catalyst for oxidation/reduction of oxygen may not be optionally used.

To rapidly diffuse oxygen, the first current collector 42 may be a porous structure in a net or mesh form or a porous metal plate formed of stainless steel, nickel, aluminum, or the like. However, the first current collector 42 is not particularly limited to the above examples, and any suitable current collector used in the art may be used. The first current collector 42 may be coated with an oxidation resistant metal or alloy in order to prevent the first current collector 42 from being oxidized.

The second current collector 44 is not particularly limited so long as the second current collector 44 has suitable conductivity. For example, the second current collector 44 may be made of stainless steel, nickel, aluminum, iron, titanium, carbon, or the like. The second current collector 44 may have a foil, plate, mesh or grid shape, more particularly a mesh shape. The mesh shape has a high current collecting efficiency and thus is suitable for use in the second current collector 44.

The term "air" as used herein is not limited to atmospheric air, and may include a combination of gases including oxygen, or pure oxygen gas. This broad definition of "air" also applies to all applications, e.g., an air battery, an air cathode, and the like.

The lithium battery may be either a lithium primary battery or a lithium secondary battery. The lithium battery may have various shapes, and in some embodiments, may have a coin, button, sheet, stack, cylinder, plane, or horn shape. The lithium battery may be used as a large-scale battery for electric vehicles and the like.

Method of Preparing the Composite Solid Electrolyte

A method of preparing the composite solid electrolyte, according to another embodiment, may include forming a polymer-containing electrolyte coating layer by coating a surface of a lithium ion conductive solid electrolyte with a composition for forming the polymer-containing electrolyte coating layer and drying the coated lithium ion conductive solid electrolyte.

First, the lithium ion conductive solid electrolyte is prepared.

The lithium ion conductive solid electrolyte may be obtained by heat-treating a mixture of a ceramic compound and an inorganic oxide, forming the heat-treated mixture in a film form, and heat-treating the resultant.

The ceramic compound may include, for example, $Li_{1.3}Al_{0.3}Ge_{1.7}(PO_4)_3$, $Li_{1.4}Al_{0.4}Ge_{1.6}(PO_4)_3$, $Li_{1.5}Al_{0.5}Ge_{1.5}(PO_4)_3$, $Li_{1.6}Al_{0.6}Ge_{1.4}(PO_4)_3$, $Li_{1.7}Al_{0.7}Ge_{1.3}(PO_4)_3$, or the like. The inorganic oxide may include $TiO_2$, $ZnO_2$, $GeO_2$, or the like.

The inorganic oxide may be added to the ceramic compound and doped by heat treatment.

The amount of the inorganic oxide may be, for example, from about 1 wt % to about 10 wt %, for example, from about 2 wt % to about 6 wt %, based on the total weight of the ceramic compound. The heat treatment process may be performed by calcination at a temperature of about 800° C. or higher.

The method of forming the lithium ion conductive solid electrolyte in a film form is not particularly limited and may be, for example, casting, tape casting, embossing, injection molding, or the like.

Among the above-listed methods, the tape casting process enables the lithium ion conductive solid electrolyte to be made in a film form. In addition, when the film-type lithium ion conductive solid electrolyte is calcined, the lithium ion conductive solid electrolyte may have enhanced ionic conductivity.

The lithium ion conductive solid electrolyte may be a porous ceramic compound, and the method according to another embodiment may further include filling pores in the porous ceramic compound with the crosslinkable polymer described above.

Next, the surface of the lithium ion conductive solid electrolyte is coated with the composition for forming the polymer-containing electrolyte coating layer and the coated resultant is dried to form the polymer-containing electrolyte coating layer.

The composition for forming the polymer-containing electrolyte coating layer may further include the aforementioned ionic conductive polymer including an alkylene oxide-based segment and an organic solvent, and if desired, the inorganic particles described above, and/or the aforementioned ionic liquid (e.g., solvate ionic liquid) including a lithium salt and a glyme, i.e., a glyme-based material.

The amount of the inorganic particles, a molar ratio of the lithium salt and the glyme-based material in the solvate ionic liquid, and a mixing ratio of the alkylene oxide-based segment and the solvate ionic liquid are as described above.

The organic solvent may be any organic solvent capable of dissolving the ion conductive polymer and may be, for example, tetrahydrofuran, acetonitrile, chloroform, acetone, dioxolane, dimethylether, ethylmethylether, monochloroethane, dichloroethane, trichloroethane, dimethoxyethane, triglyme, tetraglyme, or the like.

The amount of the ion conductive polymer in the organic solvent may be, for example, from about 0.1 wt % to about 10 wt %, for example, from about 0.3 wt % to about 7 wt %, for example, from about 0.3 wt % to about 5 wt %, based on the total weight of the organic solvent.

The coating of the composition for forming the polymer-containing electrolyte coating layer may be performed by one selected from solution casting, spray coating, bar coating, dip coating, and spin coating.

Among the above-listed coating methods, the solution casting process may enable formation of a uniform and thin polymer-containing electrolyte coating layer on the surface of the lithium ion conductive solid electrolyte.

The polymer-containing electrolyte coating layer may have a thickness of about 100 μm or less. The thickness of the polymer-containing electrolyte coating layer may be, for example, about 90 μm or less, for example, about 80 μm or less, for example, about 70 μm or less, for example, about 60 μm or less, or, for example, about 50 μm or less. The thickness of the polymer-containing electrolyte coating layer may be, for example, from about 1 μm to about 50 μm, for example, from about 5 μm to about 50 μm, for example, from about 10 μm to about 45 μm. The thickness of the polymer-containing electrolyte coating layer may be, for example, from about 10 μm to about 40 μm.

The polymer-containing electrolyte coating layer having the above thickness ranges may significantly decrease an interfacial resistance between a lithium ion conductive solid electrolyte and an anode. In addition, the composite solid electrolyte may have a high ionic conductivity at room temperature (25° C.). Thus, a lithium battery including the composite solid electrolyte has electrochemical stability at room temperature (25° C.) and thus may be stably operated.

An embodiment will now be described in further detail with reference to the following examples and comparative examples. However, these examples are for illustrative purposes only and are not intended to limit the scope of the embodiments.

EXAMPLES

Example 1: Manufacture of Lithium Symmetric Cell 1-1: Lithium Ion Conductive Solid Electrolyte Ti(OC$_4$H$_9$)$_4$ (manufactured by Aldrich) and Ge(OC$_2$H$_5$) (manufactured by Aldrich) were dissolved in ethylene glycol in a stoichiometric molar ratio. The resultant solution was added to a 0.2 molar (M) aqueous citric acid solution and gelled by stirring using a magnetic bar at 120° C. for 12 hours. Subsequently, LiNO$_3$, Al(NO$_3$)$_3$.9H$_2$O, and NH$_4$H$_2$PO$_4$ were added to the gelled solution in a stoichiometric molar ratio such that a ratio of a total mole number of Li$^+$, Al$^{3+}$, Ge$^{4+}$, and Ti$^{4+}$ to a mole number of citric acid was 4:1, and then the resultant solution was maintained at 170° C. for 4 hours. Thereafter, the gelled solution was heat-treated at 500° C. for 4 hours and the resultant solution was pulverized to obtain L$_{1.4}$Al$_{0.4}$Ge$_{0.2}$Ti$_{1.4}$(PO$_4$)$_3$ (LAGTP) powder.

The LAGTP powder was dispersed in a mixed solution of ethanol and toluene in a volume ratio of 1:1 together with polyvinyl butyl alcohol as a binder and butyl benzylphthalate as a plasticizer. The dispersion was tape-casted on a plurality of sheets, and the resultant sheets were heat-pressed at 90° C. for 10 minutes and sintered at 900° C. for 7 hours to obtain an LAGTP film.

A mixed solution prepared by dissolving 1 M 1,3-phenylenediamine and 2 M 2,2-bis(4-glycidyloxy-phenyl)propane in tetrahydrofuran was added dropwise onto the LAGTP film and the resultant LAGTP film was maintained in vacuum for 30 minutes. Thereafter, the LAGTP film was dried at 80° C. for 2 hours and polymerized at 150° C. for 24 hours to obtain an LAGTP-E film (thickness: about 0.3 mm to about 0.4 mm), of which pores were filled with epoxy resin.

Example 1-2

Composite Solid Electrolyte Including Polymer-Containing Electrolyte Coating Layer A solution for forming an electrolyte coating layer, prepared by dissolving, in acetonitrile, 4.0 wt % polyethylene oxide (PEO) (manufactured by Aldrich, Mw=600,000), bis(fluorosulfonyl)imide (LiFSI) (Central Glass, Japan), tetraethylene glycol dimethyl ether (G4) (Kishida Chemicals, Japan), and BaTiO$_3$ (manufactured by DSakai Chemicals, average particle diameter: 0.1 μm), was added dropwise onto a surface of the LAGTP-E film. The LAGTP-E film was heat-treated in vacuum at 80° C. for 12 hours, thereby completing the manufacture of a composite solid electrolyte including a PEO-containing electrolyte coating layer having a thickness of about 40 μm.

In the manufacturing processes described above, a molar ratio of Li/EO and a molar ratio of Li/G4 were about 1/8 and about 1/2, respectively. The amount of BaTiO$_3$ was about 10 wt % based on the total weight of PEO.

Example 1-3: Lithium Symmetric Cell

Li electrodes (diameter: about 15 mm, thickness: about 500 μm) were disposed on opposite surfaces of the composite solid electrolyte including a PEO-containing electrolyte coating layer and fixed thereon, thereby completing the manufacture of a lithium symmetric cell with the symmetrically disposed Li electrodes.

Comparative Example 1: Manufacture of Lithium Symmetric Cell

A lithium symmetric cell with symmetrically disposed Li electrodes was manufactured in the same manner as in Example 1, except that Li electrodes (diameter: about 15 mm, thickness: about 500 μm) were disposed on opposite surfaces of the solid electrolyte prepared in the 1-1 above instead of the composite solid electrolyte prepared in the 1-2 above and fixed thereon.

Comparative Example 2: Manufacture of Lithium Symmetric Cell 1.38 g of PEO powder (manufactured by Aldrich, Mw=600,000 Daltons) and 0.256 g of polyethylene glycol dimethyl ether (PEGDME) {CH$_3$O≤(CH$_2$CH$_2$O)$_{10}$—CH$_3$} (Mn: 500 g/mol) were dispersed in acetonitrile. Subsequently, 1 M Li(CF$_3$SO$_2$)$_2$N (LiTFSI, Wako) was added to the dispersion such that a molar ratio of Li/O was 1/18 and the resultant dispersion was stirred for 24 hours, thereby completing the preparation of an electrolyte forming composition.

The amount of PEGDME was 12 wt % based on the total weight of PEO, PEGDME, and Li(CF$_3$SO$_2$)$_2$N, and the amount of PEO was 65 wt % based on the total weight of PEO, PEGDME, and Li(CF$_3$SO$_2$)$_2$N.

The electrolyte forming composition was cast on a Teflon dish, followed by drying at 20° C. for 24 hours and further drying in vacuum at 80° C. for 12 hours to obtain a PEO$_{18}$LiTFSI-PEGDME polymer electrolyte. The polymer electrolyte had an average thickness of 60 μm.

The polymer electrolyte was impregnated with a DME solution with 1 M LiTFSI dissolved therein, thereby completing the preparation of a polymer electrolyte.

Li electrodes (diameter: about 15 mm, thickness: about 500 μm) were disposed on opposite surfaces of the polymer electrolyte and fixed thereon, thereby completing the manufacture of a lithium symmetric cell with the symmetrically disposed Li electrodes.

Comparative Example 3: Manufacture of Lithium Symmetric Cell

A lithium symmetric cell was manufactured in the same manner as in Comparative Example 2, except that an electrolyte forming composition was prepared without adding PEGDME.

Evaluation Example 1: Impedance Characteristics—Evaluation of Interfacial Resistance and Ionic Conductivity

Evaluation Example 1-1: Interfacial Resistance

Impedance characteristics of the lithium symmetric cells manufactured according to Example 1 and Comparative Examples 1 to 3 were evaluated.

The impedances thereof were measured using a Solatron SI1260 impedance/frequency analyzer (frequency range: 1 MHz to 1 Hz, amplitude: 10 mV). An operating temperature of the lithium symmetric cells of Example 1 and Comparative Example 1 was maintained at 25° C., an operating temperature of the lithium symmetric cell of Comparative Example 2 was maintained at 60° C., and an operating temperature of the lithium symmetric cell of Comparative Example 3 was maintained at 80° C. Impedances according to storage time were measured and the measurement results are shown as Nyquist plots in FIGS. 6A to 6D.

Figure 6A:
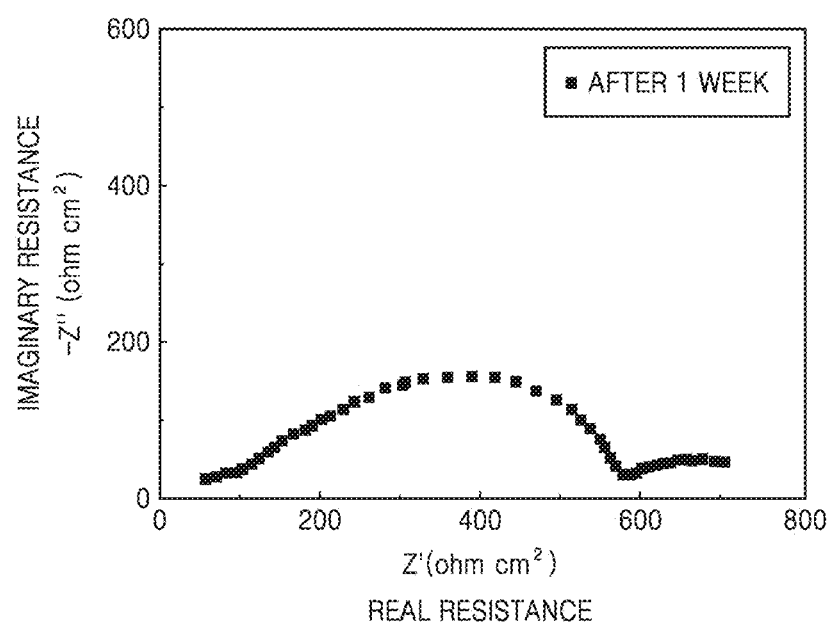
FIGS. 6A to 6C each a graph of imaginary resistance (Z", ohms·cm$^2$) versus real resistance (Z', ohms·cm$^2$)
Figure 6B:
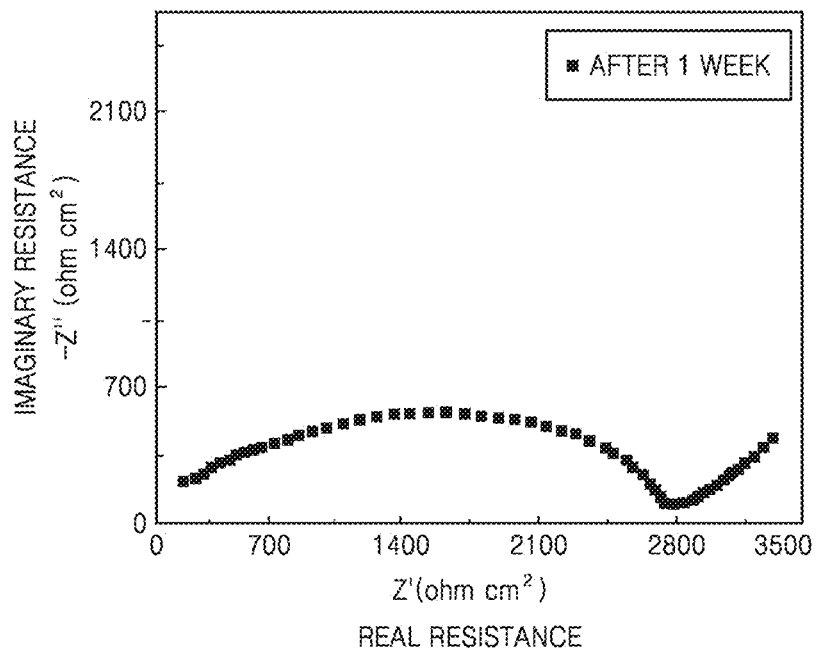
Figure 6C:
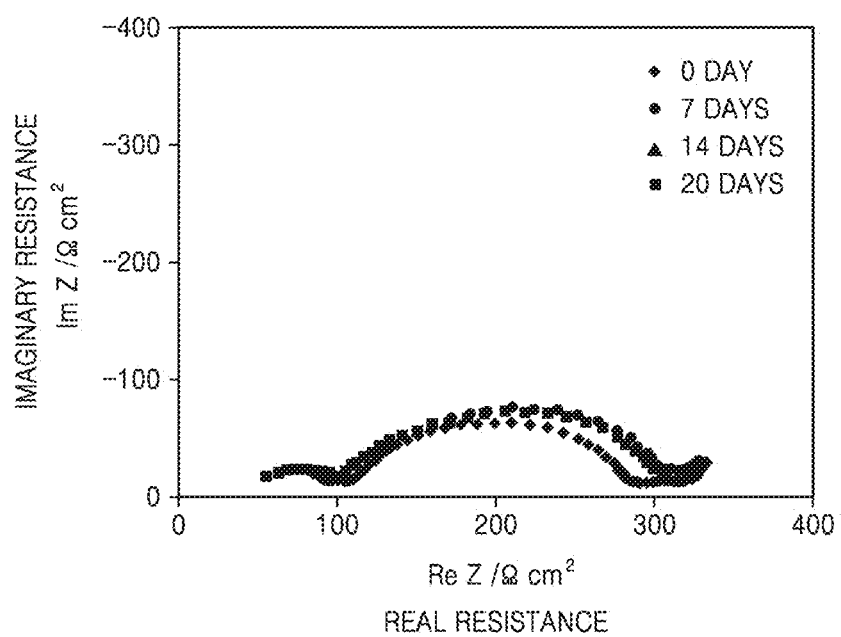
Figure 6D:
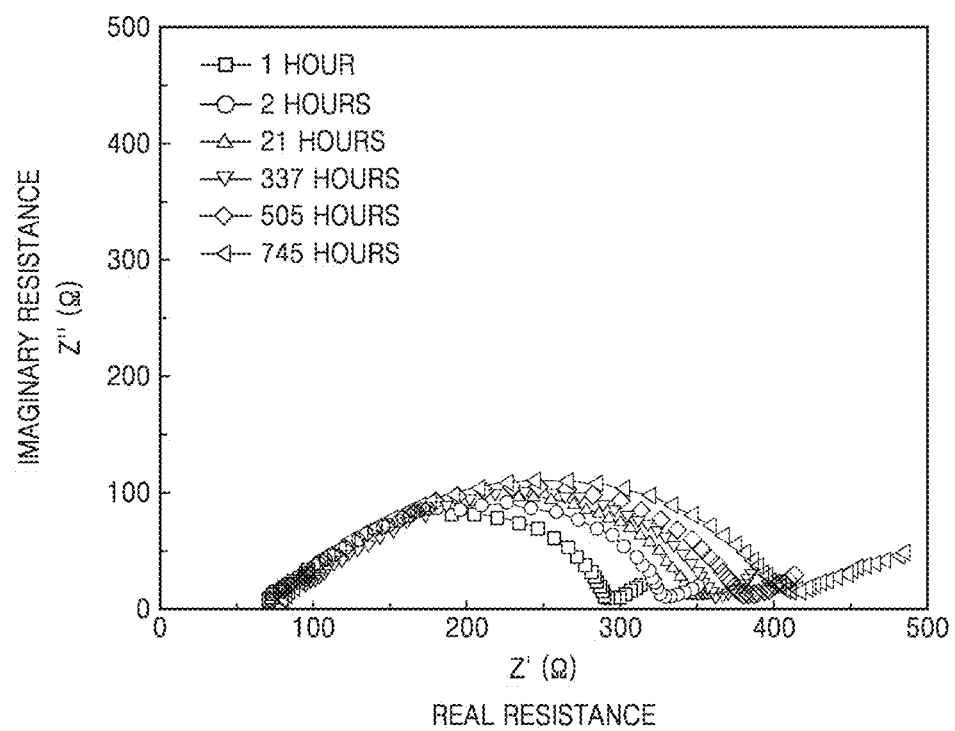
FIG. 6D is as graph of imaginary resistance (Z", ohms) versus real resistance (Z', ohms), respectively showing impedance characteristics results according to storage time for lithium symmetric cells manufactured according to Example 1 and Comparative Examples 1 to 3.

FIGS. 6A and 6B illustrate impedance measurement results of the lithium symmetric cells of Example 1 and Comparative Example 1, respectively after 7 days. FIG. 6C illustrates impedance measurement results of the lithium symmetric cell of Comparative Example 2 at an initial state and after 7 days, 14 days, and 20 days. FIG. 6D illustrates impedance measurement results of the lithium symmetric cell of Comparative Example 3 after 1 hour, 2 hours, 21 hours, 337 hours, 505 hours, and 745 hours.

In FIGS. 6A to 6D, an interfacial resistance of the electrode is determined by the position and size of a semicircle. In this regard, a difference between x-intercepts on left and right sides of the semicircle denotes the interfacial resistance at the electrode.

Referring to FIGS. 6A and 6B, it is confirmed that the electrode resistance of the lithium symmetric cell of Example 1 decreased by about 450% or more as compared to that of the lithium symmetric cell of Comparative Example 1. The lithium symmetric cells of Comparative Examples 2 and 3 had a very high electrode resistance and thus measurement of the impedances thereof was impossible. Referring to FIGS. 6C and 6D, from the impedance measurement results at 60° C. and 80° C., it is confirmed that the lithium symmetric cell of Comparative Example 2 had a decreased electrode resistance as compared to the lithium symmetric cell of Comparative Example 3.

Evaluation Example 1-2: Ionic Conductivity

An ionic conductivity of the composite solid electrolyte of the lithium symmetric cell of Example 1 was evaluated at 25° C.

The evaluation of the ionic conductivity of the composite solid electrolyte was conducted by obtaining a resistance R from a circular arc in the Nyquist plot obtained from the evaluation of the impedance characteristics described above and inserting the resistance R as Equation 1 below:

$$\sigma = l/(R \cdot A) \text{ } (\sigma\text{: ionic conductivity, } R\text{: resistance, } l\text{: thickness of composite solid electrolyte, } A\text{: area of electrode)} \quad \text{Equation 1}$$

In Equation 1, the thickness of the composite solid electrolyte was about 400 μm, and the area of the electrode was 2 cm². From the results, it is confirmed that the lithium symmetric cell of Example 1 had an ionic conductivity of $1.06 \times 10^{-4}$ S/cm at 25° C.

Evaluation Example 2: Growth of Lithium Dendrites—Optical Image and Electrochemical Stability Evaluation

Evaluation Example 2-1: Optical Microscope

The lithium symmetric cell of Example 1 was put in a sealed chamber with a glass window and observed using an optical microscope to evaluate whether or not lithium dendrites were grown.

As the optical microscope, VHX-1000, manufactured by Keyence, was used. The optical microscope image was an image of a cross-section of the lithium symmetric cell of Example 1 at 25° C. and a current density of 1.0 mA/cm² at an initial stage and after a polarization time of 32 hours. The results are shown in FIGS. 7A and 7B.

Figure 7A:
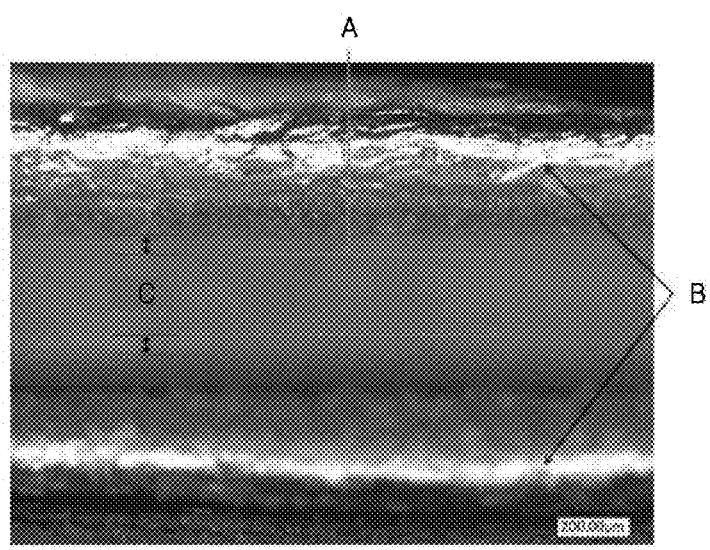
FIGS. 7A and 7B are cross-section optical microscope images of the lithium symmetric cell of Example 1 at 25° C. and at a current density of 1.0 milliampere per square centimeter (mA/cm$^2$) at an initial stage and after 32 hours, respectively.

FIG. 7A is an optical image showing the cross-section of the lithium symmetric cell of Example 1 at an initial stage. In FIG. 7A, A is an LAGTP film, B is a Li electrode, and C is a PEO-containing electrolyte coating layer. FIG. 7B is an optical image showing the cross-section of the lithium symmetric cell of Example 1 after the polarization time of 32 hours.

Figure 7B:
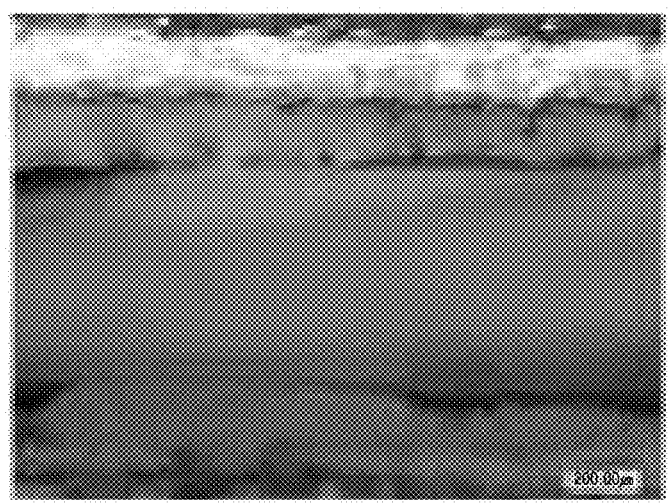

Referring to FIG. 7B, it is confirmed that the lithium symmetric cell of Example 1 maintained a voltage of 300 mV even after the polarization time of 32 hours and underwent free lithium dendrite growth.

2-2: Electrochemical Stability

The lithium symmetric cell of Example 1 was packaged in a plastic bag and then put in a glove box filled with argon gas, and an electrochemical stability thereof by the growth of lithium dendrites was evaluated. The evaluation results are shown in FIG. 8.

The electrochemical stability was evaluated by observing changes in voltage of the lithium symmetric cell of Example 1 by using BTS 2004H (Nagano Keiki, Tokyo, Japan) at 25° C. and a current density of 1.0 mA/cm² within a voltage range from −0.8 V to 0.2 V versus Li/Li⁺.

Figure 8:
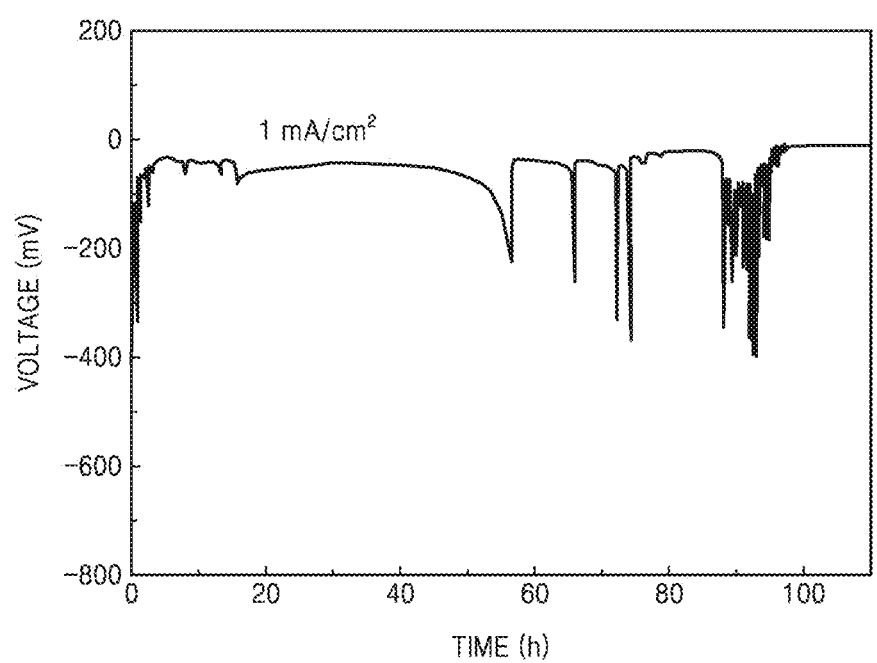
FIG. 8 is a graph of voltage (millivolts, mV) versus time (hours, h) showing changes in voltage according to time of the lithium symmetric cell of Example 1.

Referring to FIG. 8, it is confirmed that the lithium symmetric cell of Example 1 had no change in voltage up to 40 hours and a sudden change in voltage after 45 hours. From the results, it is confirmed that short circuit due to the growth of lithium dendrites did not occur up to 40 hours.

As is apparent from the foregoing description, in a lithium battery including a composite solid electrolyte according to an embodiment, an interfacial resistance $R_i$ between an anode of the lithium battery and the composite solid electrolyte at room temperature (25° C.) is improved and the growth of lithium dendrites may be suppressed. In addition, the lithium battery may have enhanced ionic conductivity at room temperature (25° C.) and enhanced electrochemical stability.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite solid electrolyte comprising:
   a lithium ion conductive solid electrolyte; and
   a polymer-containing electrolyte coating layer on a surface of the lithium ion conductive solid electrolyte,
   wherein the polymer-containing electrolyte coating layer comprises an ion conductive polymer having an alkylene oxide segment, wherein the polymer-containing electrolyte coating layer has a thickness of about 40 micrometers or less,
   wherein the lithium ion conductive solid electrolyte is porous,
   wherein the lithium ion conductive solid electrolyte comprises a ceramic composite represented by Formula 1:

$$Li_{1+x}Al_yGe_z(M2)_wP_{3+s}O_{12+t}$$  Formula 1 wherein M2 is at least one selected from titanium, tantalum, and zirconium, and
   $0 \leq x \leq 1$, $0 \leq y \leq 1$, $0 < z \leq 1$, $0 \leq w \leq 2$, $0 \leq s \leq 1$, and $0 \leq t \leq 1$, and
   wherein the polymer-containing electrolyte coating layer further comprises at least one selected from inorganic particles, and a solvate ionic liquid comprising a lithium salt and a glyme.

2. The composite solid electrolyte of claim 1, wherein the ion conductive polymer is at least one selected from polyethylene oxide, polypropylene oxide, polybutylene oxide, a polyethylene oxide-polypropylene oxide blend, a polyethylene oxide-polybutylene oxide blend, a polyethylene oxide-polypropylene oxide-polybutylene oxide blend, a polyethylene oxide-polypropylene oxide block copolymer, a polyethylene oxide-polybutylene oxide block copolymer, a polyethylene oxide-polypropylene oxide-polybutylene oxide block copolymer, a polybutylene oxide-polyethylene oxide-polybutylene oxide block copolymer, a polyethylene oxide-polybutylene oxide-polyethylene oxide block copolymer, polyethylene oxide-grafted polymethyl methacrylate, polypropylene oxide-grafted polymethyl methacrylate, and polybutylene oxide-grafted polymethyl methacrylate.

3. The composite solid electrolyte of claim 1, wherein the ion conductive polymer is at least one selected from polyethylene oxide, polypropylene oxide, a polyethylene oxide-polypropylene oxide blend, a polyethylene oxide-polypropylene oxide block copolymer, and a polyethylene oxide-polypropylene oxide-polyethylene oxide block copolymer.

4. The composite solid electrolyte of claim 1, wherein the ion conductive polymer has a weight average molecular weight of about 100,000 Daltons to about 1,000,000 Daltons.

5. The composite solid electrolyte of claim 1, wherein the inorganic particles comprise at least one selected from $BaTiO_3$, $Al_2O_3$, ZnO, $SiO_2$, $TiO_2$, $ZrO_2$, a zeolite, a metal-organic framework, and a polyhedral oligomeric silsesquioxane.

6. The composite solid electrolyte of claim 1, wherein the inorganic particles have a particle diameter of about 500 nanometers or less.

7. The composite solid electrolyte of claim 1, wherein an amount of the inorganic particles is from about 5 weight percent to about 15 weight percent, based on a total weight of the ion conductive polymer.

8. The composite solid electrolyte of claim 1, wherein the lithium salt is at least one selected from LiSCN, $LiN(CN)_2$, $LiClO_4$, $LiBF_4$, $LiAsF_6$, $LiPF_6$, $LiCF_3SO_3$, $Li(FSO_2)_2N$, $Li(CF_3SO_2)_3C$, $LiN(SO_2CF_3)_2$, $LiN(SO_2CF_2CF_3)_2$, $LiSbF_6$, $LiPF_3(CF_2CF_3)_3$, $LiPF_3(C_2F_5)_3$, $LiPF_3(CF_3)_3$, and $LiB(C_2O_4)_2$.

9. The composite solid electrolyte of claim 1, wherein the glyme is at least one selected from a monoglyme, a diglyme, a triglyme, and a tetraglyme.

10. The composite solid electrolyte of claim 1, wherein a molar ratio of the lithium salt and the glyme in the solvate ionic liquid is from about 1:1 to about 1:4.

11. The composite solid electrolyte of claim 1, wherein the lithium ion conductive solid electrolyte further comprises a ceramic composite represented by Formula 2:

$$Li_{7-a}La_{3-a}(M3)_aZr_{2+b}C_{12+c}$$  Formula 2 wherein M3 is at least one selected from aluminum and cerium, and
    $0 \leq a \leq 1$, $0 \leq b \leq 1$, and $0 \leq c \leq 1$.

12. The composite solid electrolyte of claim 1, wherein the lithium ion conductive solid electrolyte further comprises a cross-linkable polymer, and
    wherein the cross-linkable polymer is disposed in a pore of the lithium ion conductive solid electrolyte.

13. The composite solid electrolyte of claim 1, wherein the composite solid electrolyte has an ionic conductivity of $1 \times 10^{-4}$ Siemens per centimeter or more at 25° C.

14. A protected anode comprising:
    an anode comprising lithium metal or a lithium alloy; and
    the composite solid electrolyte according to claim 1,
    wherein the polymer-containing electrolyte coating layer of the composite solid electrolyte contacts the anode.

15. The protected anode of claim 14, wherein, when determined in a Nyquist plot obtained from impedance measurement, an interfacial resistance at 25° C. between the anode and the composite solid electrolyte is one-fourth or less of an interfacial resistance at 25° C. between the anode and the lithium ion conductive solid electrolyte.

16. The protected anode of claim 14, wherein a dendrite is not present at a surface of the protected anode after treatment at 25° C. and a current density of 1.0 mA/cm² for 40 hours.

17. A lithium battery comprising the protected anode according to claim 14 and a cathode.

18. The lithium battery of claim 17, further comprising, between the protected anode and the cathode, at least one intermediate layer selected from a separator and a liquid electrolyte.

19. The lithium battery of claim 17, wherein the lithium battery is a lithium metal battery or a lithium air battery.

20. The lithium battery of claim 17, wherein the lithium battery is a solid state lithium battery and does not comprise a solvent.

21. A method of preparing the composite solid electrolyte according to claim 1, the method comprising:
    coating a surface of a lithium ion conductive solid electrolyte with a composition for forming a polymer-containing electrolyte coating layer to form a polymer-containing electrolyte coating layer on the surface of the lithium ion conductive solid electrolyte;
    drying the coated lithium ion conductive solid electrolyte to prepare the composite solid electrolyte; and
    resulting in the composite solid electrolyte according to claim 1.

22. The method of claim 21, wherein the coating is performed by solution casting, spray coating, bar coating, dip coating, or spin coating.

* * * * *